No. 746,613. PATENTED DEC. 8, 1903.
V. WAID.
CAR BRAKE.
APPLICATION FILED APR. 25, 1903.
NO MODEL.
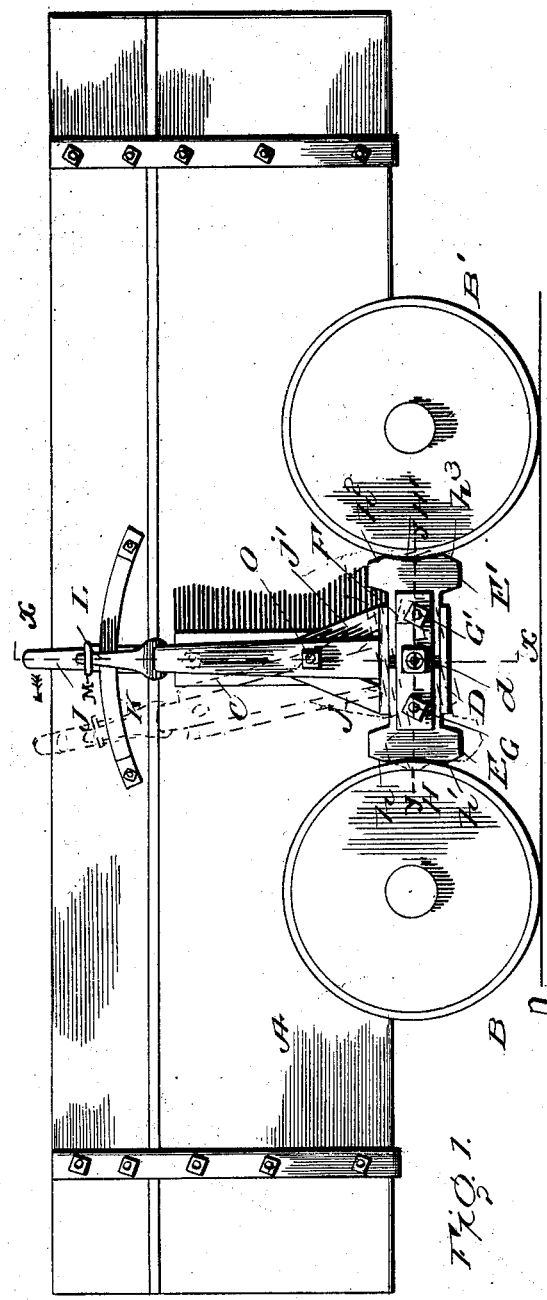
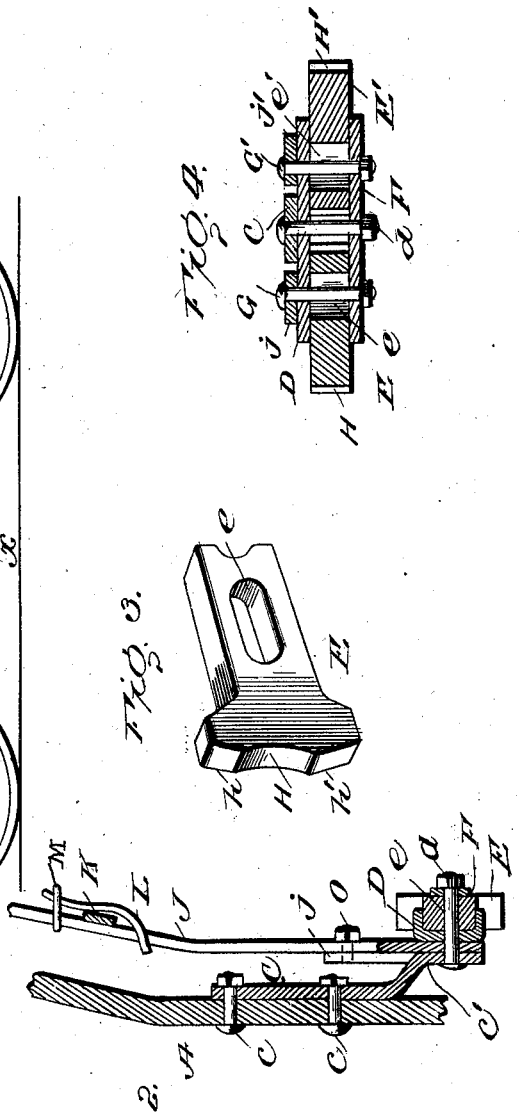
Witnesses
Inventor
Victor Waid
By A. S. Pattison
Attorney No. 746,613.

Patented December 8, 1903.

UNITED STATES PATENT OFFICE.

VICTOR WAID, OF EASTLAKE, ALABAMA.

CAR-BRAKE.

SPECIFICATION forming part of Letters Patent No. 746,613, dated December 8, 1903.

Application filed April 25, 1903. Serial No. 154,365. (No model.)

*To all whom it may concern:*

Be it known that I, VICTOR WAID, a citizen of the United States, residing at Eastlake, in the county of Jefferson and State of Alabama, have invented new and useful Improvements in Car-Brakes, of which the following is a specification.

My invention relates to improvements in car-brakes, and pertains more particularly to that class which are applied between two wheels of a car.

The object of my invention is to provide a car-brake placed between two wheels of the car and so arranged and constructed that after the brake is partly set it will more firmly lock itself and absolutely lock the two wheels together against rotation.

My device also provides a brake which is adapted to be readily operated from the car or from the outside or side of the car and which is very easily operated and very readily unset.

Another object of my invention is to provide a device of this character which is adapted to be attached to any car without any changing or arranging of the car whatever and being adjustable so that it will fit cars having the wheels a greater or shorter distance apart.

Another object of my invention is to provide a more simple, cheap, and effective brake which is adapted to positively lock the wheels together, which has not been otherwise done.

In the accompanying drawings, Figure 1 is a side view of that portion of the car showing my improved brake. Fig. 2 is a vertical sectional view taken on line $x$ $x$ of Fig. 1. Fig. 3 is a detached view of one of the shoes. Fig. 4 is a horizontal sectional view taken on line $y$ $y$ of Fig. 1.

Referring now to the drawings, A represents the car, which may be of any structure whatever, as this forms no part of my invention, and B B' represent the two wheels, which are as a rule spaced about a foot or two apart and are rigidly secured to a truck, which may be pivotally connected to the body of the car, or said wheels may be attached directly to the bottom of the car, as this forms no part of my invention, as my device is applicable to any car in which the wheels are arranged in pairs and said wheels in each pair being but a short distance apart.

The side of the car A between the wheels B and B' is provided with a vertically-disposed plate C, which is secured thereto by means of bolts $c$, while the lower end of said plate is bent slightly outward at $c'$, thus forming an offset at the lower end, the purpose of which will be hereinafter more fully described. Located between said wheel is an elongated horizontal member D, which is pivoted to the offset $c'$ of the member C by the pivot $d$, and said member D is U-shaped in cross-section. Within said member D are the brake-shoes E and E', which are provided with elongated openings $e$ and $e'$, and on the outside of said shoes is a plate F, and passing through said plate F, the openings in the shoes E and E', and through the member D are bolts G and G', and thus it is seen that the shoes are adjustably held in the member D and can be adjusted outwardly or inwardly when the distance between the wheels of a car is of a greater or less distance apart, and thus I provide a brake which is adapted to be attached to any car.

The shoes E and E' extend, as before stated, adjacent the two wheels, and the shoe is provided with a central curved position H, which is adapted to allow of the free rotation of the car-wheel, while the shoe E' is provided with a curved portion H', which is also adapted to allow of the free rotation of the other of the two car-wheels. The said shoe E is provided with the beveled portions $h$ and $h'$, which are adapted to engage the wheel B, and the shoe E' is also provided with the beveled portion $h^2$ and $h^3$, and it will be readily seen that the distance between the points $h$ and $h^3$ or $h'$ and $h^2$ is a greater distance than that between the points H and H', and thus it will be seen that the tilting of the member D in the direction indicated by arrow in Fig. 1 will bring the beveled portions $h$ and $h^3$ in engagement with the wheels B and B', and the continued movement of the wheels forces the shoe E' upward and the shoe E downward, and thus the continued rotation or the wheel will so jam the two shoes between the wheels that it becomes an absolute lock between the same and the two wheels are locked against positive rotation. The tilting of the member and shoes in the opposite direction will lock the wheels, the same as before described, if the car, or, in other words, the wheels, are moving in the opposite direction. It is understood that the distance between the wheels B and B' is less than the distance between either of the points $h$ and $h^3$ or $h'$ and $h^2$, and thus it will be seen that it is impossible for the shoes to pass the wheels, but must either be in a horizontal position or in a jammed position between the wheels. Secured to said horizontal member D is an upwardly-extending lever J, which is rigidly secured thereto and braced by the bars or braces $j$ and $j'$, and thus it is seen that the swinging of the member D is accomplished through the medium of said lever. Said braces $j$ and $j'$ have their lower ends secured to the bolts G and G', and the upper ends of said braces are secured to the lever J by means of a bolt O. The upper end of the lever passes under a strip K, carried by the side of the car A and which also serves as a stop to absolutely prevent the member D from swinging too far in either direction. Passing over the upper end of said lever J is a spring L, which has its upper end curved upwardly around the guide or straps K, and the said lever carries a ring or loop M, which is adapted to slip over the upper end of the spring, and thus the lever J is held in a vertical position and the brake-shoes are normally out of engagement with the wheel. This holding means is not intended to absolutely hold the said lever, but is intended to simply hold the lever against normal conditions; but any extraordinary exertion or pressure on the lever will move the same, and thus set the brake.

My brake is intended more particularly for cars used in mines, and it is adapted to be operated by a person standing beside the car, as it does not take any power to set the same. It could also be set when the car is in motion by simply striking the upper end of the lever, which will move the same a sufficient distance to bring the brake-shoes in engagement with the wheels, and thus the brake will be firmly set as the continued turning of the wheels sets the brake tighter and tighter until the two shoes are jammed between the wheels and the wheels are absolutely locked against rotation.

Having thus described my invention, what I claim as new, and desire to secure by Letters Patent, is—

1. In a car-brake, the combination with two car-wheels, of a member between said wheels and adapted to be jammed therebetween by the friction of the wheels when the car is traveling in either direction.

2. In a car-brake, the combination with two car-wheels, of an intermediately pivoted member between said wheels and adapted to be jammed therebetween by the friction of the wheels when the car is traveling in either direction.

3. In a car-brake, the combination with two car-wheels, of an intermediate pivoted bar between said wheels, adjustable brake-shoes carried by said bar and said brake-shoes adapted to be wedged or jammed between said wheels by the friction thereof when the car is traveling in either direction.

4. In a car-brake, the combination with two car-wheels, of a pivoted member between said wheels, brake-shoes carried by said member and having concaved central portions adapted to allow of the free rotation of the wheels, said shoes having outer beveled portions, and means for rocking said member on its pivot, whereby the beveled portions of the shoes engage said wheels.

5. In a car-brake, the combination with two car-wheels, of a pivoted member between said wheels, brake-shoes carried by said member and having concaved central portions adapted to allow the wheels to rotate, said shoes having outer beveled portions, and a lever rigidly connected to said member, whereby the same is rocked on its pivot and the beveled portions of the shoes engage said wheels.

6. In a car-brake, the combination with two car-wheels, of a pivoted member between said wheels, brake-shoes carried by said member and having concaved central portions adapted to allow the wheel to rotate, said shoes having outer beveled portions, a lever rigidly connected to said member, means for holding said lever and means for limiting the movement of said lever in either direction.

7. In a car-brake, the combination with two car-wheels, of an elongated horizontal member pivoted between said wheels, adjustable shoes carried by said horizontal member, and means for rocking said member whereby the shoes are jammed between the wheels.

8. In a car-brake, the combination with two car-wheels, of an elongated horizontal member pivoted between said wheels, adjustable shoes carried by said horizontal member, and a lever carried by said horizontal member and adapted to rock the same.

9. In a car-brake, the combination with two car-wheels, of a horizontal member pivoted between said wheels, shoes within said horizontal member and having elongated openings therein, clamping-bolts carried by said member and passing through said elongated openings, a lever rigidly secured to said horizontal member, a guide for the upper end of said lever and adapted to limit the movement thereof in either direction, and a spring carried by said lever and passing around the said guide and adapted to hold said lever in a vertical position.

10. In a car-brake, the combination with two car-wheels, of a centrally-pivoted member between said wheels, independently-adjustable brake-shoes carried by said pivoted means, and means for rocking said member on its pivot, whereby the said shoes are jammed between said wheels by friction when the car is traveling in either direction.

11. In a car-brake, the combination with two wheels, of an elongated horizontal member U-shaped in cross-section and pivoted intermediate its ends between said wheels, shoes with said U-shaped elongated horizontal member and having elongated openings therein, clamping-bolts carried by said member and passing through said elongated openings in the shoes, a lever rigidly secured to said horizontal member intermediate its ends, brace-rods secured to said lever and the shoe-holding bolts, and means for holding said lever in a vertical position whereby the shoes are held away from the wheels.

12. In a car-brake, the combination with two car-wheels, of a pivoted member between said wheels and a lever rigidly secured to said pivoted member and adapted to throw the same in engagement with said wheels.

13. In a car-brake, the combination with two car-wheels, of a member pivoted between the same, brake-shoes carried by said member and having outer concaved faces and upper and lower beveled edges forming friction-surfaces, and means for rocking said pivoted member.

14. In a car-brake, the combination with two car-wheels, of brake-shoes pivoted between the same and having outer concaved upper and lower beveled edges extending from said concaved faces, and forming friction-surfaces.

15. In a car-brake, the combination with two car-wheels, of a pivoted member between said wheels, a lever rigidly secured to said pivoted member and adapted to throw the same in engagement with said wheels, and means for holding said member out of engagement with said wheels.

16. In a car-brake, the combination with two car-wheels, of a pivoted member between said wheels, a lever rigidly secured to said pivoted member, and adapted to throw the same in engagement with said wheels, a strip adjacent the upper end of said lever, and means for frictionally holding said lever to said strip whereby the pivoted member is normally held out of engagement with said wheels.

In testimony whereof I have hereunto set my hand in the presence of two subscribing witnesses.

VICTOR WAID.

Witnesses:
O. J. SMITH,
J. C. WAID.